United States Patent
Engfehr et al.

(10) Patent No.: US 10,934,948 B2
(45) Date of Patent: Mar. 2, 2021

(54) SYSTEM AND METHOD TO DETERMINE FAILURE OF A GAS SHUT OFF VALVE

(71) Applicant: Caterpillar Inc., Peoria, IL (US)

(72) Inventors: Matthew J. Engfehr, Dunlap, IL (US); Nathan P. Atterberry, Washington, IL (US); Hua Xu, Dunlap, IL (US)

(73) Assignee: Caterpillar Inc., Peoria, IL (US)

(*) Notice: Subject to any disclaimer, the term of this patent is extended or adjusted under 35 U.S.C. 154(b) by 476 days.

(21) Appl. No.: 15/888,126

(22) Filed: Feb. 5, 2018

(65) Prior Publication Data

US 2019/0242307 A1 Aug. 8, 2019

(51) Int. Cl.
*F02D 19/06* (2006.01)
*F02D 41/22* (2006.01)
*F02M 35/10* (2006.01)
*F02D 41/00* (2006.01)

(52) U.S. Cl.
CPC ..... *F02D 19/0623* (2013.01); *F02D 19/0605* (2013.01); *F02D 19/0615* (2013.01); *F02D 19/0628* (2013.01); *F02D 19/0642* (2013.01); *F02D 19/0681* (2013.01); *F02D 41/0027* (2013.01); *F02D 41/221* (2013.01); *F02M 35/1038* (2013.01); *F02D 19/0665* (2013.01); *F02D 2200/0602* (2013.01)

(58) Field of Classification Search
CPC ............. F02D 19/0605; F02D 19/0615; F02D 19/0623; F02D 19/0628; F02D 19/0642; F02D 19/0665; F02D 19/0681; F02D 41/221; F02D 41/0027; F02D 2200/0602; F02M 21/0242; F02M 35/1038

See application file for complete search history.

(56) References Cited

U.S. PATENT DOCUMENTS

| | | | | |
|---|---|---|---|---|
| 5,690,078 | A | * 11/1997 | Ofner | ........... F02M 21/0212 123/27 R |
| 6,401,698 | B1 | 6/2002 | Yamazaki et al. | |
| 6,467,466 | B1 | 10/2002 | Maekawa et al. | |
| 7,322,345 | B2 | 1/2008 | Saito et al. | |
| 8,967,123 | B2 | * 3/2015 | Saito | ............. F02D 19/0681 123/529 |
| 9,976,523 | B2 | * 5/2018 | Sarikaya | ............ F02M 37/0023 |
| 2001/0022173 | A1 | * 9/2001 | Fabre | ............. F02M 25/0809 123/519 |
| 2006/0111875 | A1 | * 5/2006 | Breen | ............. F16K 37/0091 702/188 |

(Continued)

*Primary Examiner* — Phutthiwat Wongwian
*Assistant Examiner* — Arnold Castro

(57) ABSTRACT

A method for determining failure of an electromechanically actuated gas shut off valve includes sensing and recording a gas fuel rail pressure and a boost pressure from an air intake manifold at a first time after the dual fuel engine has been started. The method includes opening the gas shut off valve at a second time, holding the gas shut off valve in its open state, and then closing the gas shut off valve after a predetermined interval at a third time. The method includes comparing an actual gas rail pressure decay rate to a threshold gas rail pressure decay rate for the predetermined interval, and determining failure of the gas shut off valve when the actual gas rail pressure decay rate is less than the threshold gas rail pressure decay rate. Upon determining failure of the gas shut off valve, the method also includes initiating a mitigating action.

18 Claims, 7 Drawing Sheets

(56) References Cited

U.S. PATENT DOCUMENTS

| | | | |
|---|---|---|---|
| 2013/0013256 A1* | 1/2013 | Saito | F02D 19/027 |
| | | | 702/183 |
| 2013/0014729 A1* | 1/2013 | Saito | F02M 21/0239 |
| | | | 123/458 |
| 2016/0273472 A1* | 9/2016 | Ariie | F02M 37/0047 |
| 2019/0040818 A1* | 2/2019 | Engfehr | F02M 21/0245 |
| 2019/0128205 A1* | 5/2019 | Eckerdal | F02D 19/023 |
| 2019/0242307 A1* | 8/2019 | Engfehr | F02M 21/0242 |
| 2019/0293015 A1* | 9/2019 | Uhrich | F02D 41/3094 |
| 2020/0102920 A1* | 4/2020 | Kabrich | F02D 41/0027 |

* cited by examiner

SYSTEM AND METHOD TO DETERMINE FAILURE OF A GAS SHUT OFF VALVE

TECHNICAL FIELD

The present disclosure relates to a dual fuel engine. More specifically, the present disclosure relates to determining failure of a shut off valve associated with a gaseous fuel rail of the dual fuel engine.

BACKGROUND

An electromechanically actuated shut off valve may be used in a fuel rail of a dual fuel engine to selectively allow a flow of charge, for example, gas into the fuel rail downstream of the shut off valve. This shut off valve may be operatively opened and closed, with the help of a controller, numerous times during engine operation. Over time or with repeated use of the shut off valve, it may be possible that the shut off valve may fail to operate as intended. One exemplary scenario of the shut off valve failing to operate as intended may be when the controller commands an actuator associated with the shut off valve to move the shut off valve into a fully closed position, and the shut off valve does not move into the fully closed position. Rather, the shut off valve may continue to remain in its open position, or may be rendered in a partially closed position instead of the fully closed position.

In such a scenario, undesirable consequences may occur in the operation of the dual fuel engine. For example, when the shut off valve is moved into the partially closed position instead of the fully closed position, the partially closed shut off valve may continue to allow passage of the charge downstream of the shut off valve and into the fuel rail associated with the engine which can lead to undesirable engine operation. Therefore, it may be advantageous to determine whether the shut off valve has failed, or is operating as intended.

U.S. Pat. No. 6,467,466 (hereinafter referred to as "the '466 patent") relates to a gas leakage detection method for a gas-fueled internal combustion engine. The method of the '466 patent discloses that operation of the engine is stopped and multiple shut off valves are closed before determining if there is any leakage in a gas feed path containing the shut-off valves. However, with use of gas pressure values that are obtained from gas pressure sensors downstream of each gas shut off valve, the gas leakage detection method of the '466 patent may not be applicable for use in determining whether a gas shut-off valve has failed or not when the engine is in operation as engine operation would need to be discontinued in order to perform the gas leakage detection test.

SUMMARY

In an aspect of the present disclosure, a method for determining failure of a gas shut off valve supplying a gas fuel rail associated with a dual fuel engine is disclosed. The method includes sensing and recording a gas fuel rail pressure at a first time using a first sensor in communication with the gas fuel rail after the dual fuel engine has been started. The method also includes sensing and recording a boost pressure at the first time using a second sensor in communication with an intake air manifold. The method further includes opening the gas shut off valve at a second time and holding the gas shut off valve in its open state. The method then includes closing the gas shut off valve after a predetermined interval at a third time. The method further includes comparing an actual gas rail pressure decay rate to a threshold gas rail pressure decay rate for the predetermined interval, and determining failure of the gas shut off valve when the actual gas rail pressure decay rate is less than the threshold gas rail pressure decay rate. Upon determining failure of the gas shut off valve, the method also includes initiating a mitigating action.

In another aspect of the present disclosure, a control system for determining failure of a gas shut off valve supplying a gas fuel rail associated with a dual fuel engine is disclosed. The control system includes a gas fuel rail pressure sensor in communication with the gas fuel rail, an air intake manifold pressure sensor in communication with an air intake manifold associated with the dual fuel engine, and a controller that is disposed in communication with the gas fuel rail pressure sensor and the air intake manifold pressure sensor. While the dual fuel engine is running, the controller senses and records a gas fuel rail pressure at a first time from the gas fuel rail pressure sensor. The controller senses and records a boost pressure at the first time from the air intake manifold pressure sensor. The controller opens the gas shut off valve at a second time and holds the gas shut off valve in its open state. The controller closes the gas shut off valve after a predetermined interval at a third time. The controller compares an actual gas rail pressure decay rate to a threshold gas rail pressure decay rate for the predetermined interval. The controller determines a failure of the gas shut off valve when the actual gas rail pressure decay rate is less than the threshold gas rail pressure decay rate. Upon determining failure of the gas shut off valve, the controller initiates a mitigating action.

In yet another aspect of the present disclosure, a dual fuel engine configured for operation using a gaseous fuel and a liquid fuel is disclosed. The dual fuel engine includes an engine block defining a plurality of cylinders, and a piston that is disposed for reciprocating movement within each of the plurality of cylinders. The dual fuel engine also includes a liquid fuel rail configured to supply a liquid fuel from a liquid fuel reservoir to each of the plurality of cylinders, and a gas fuel rail configured to supply a gaseous fuel from a gaseous fuel reservoir to each of the plurality of cylinders. The dual fuel engine further also includes an air intake manifold in fluid communication with each of the plurality of cylinders. The dual fuel engine also includes a gas fuel rail pressure sensor in communication with the gas fuel rail, an air intake manifold pressure sensor in communication with the air intake manifold, and a controller that is disposed in communication with the gas fuel rail pressure sensor and the air intake manifold pressure sensor. While the dual fuel engine is running, the controller is configured to sense and record a gas fuel rail pressure at a first time from the gas fuel rail pressure sensor. The controller is also configured to sense and record a boost pressure at the first time from the air intake manifold pressure sensor. The controller opens the gas shut off valve at a second time and holds the gas shut off valve in its open state. The controller closes the gas shut off valve after a predetermined interval at a third time. The controller compares an actual gas rail pressure decay rate to a threshold gas rail pressure decay rate for the predetermined interval. The controller determines a failure of the gas shut off valve when the actual gas rail pressure decay rate is less than the threshold gas rail pressure decay rate. Upon determining failure of the gas shut off valve, the controller initiates a mitigating action.

DETAILED DESCRIPTION

Figure 1:
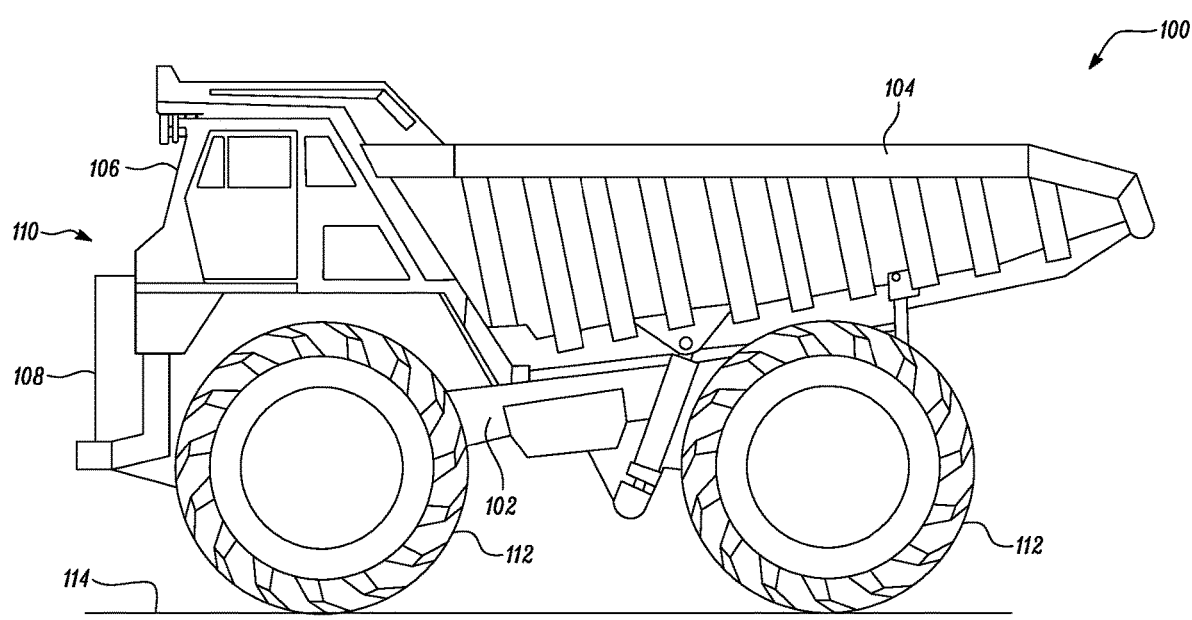
FIG. 1 illustrates a machine, according to an exemplary embodiment of the present disclosure.

FIG. 1 illustrates an exemplary machine 100, according to an embodiment of the present disclosure. As shown in FIG. 1, the machine 100 embodies a large mining truck (LMT). Although the machine 100 is depicted as a LMT in the illustrated embodiment of FIG. 1, in other embodiments, the machine 100 may alternatively embody an off-highway truck, a quarry truck, an articulated truck, a wheel loader, a tractor, a locomotive, or any other type of mobile machine in which aspects of the present disclosure may be applied.

Referring to FIG. 1, the machine 100 includes a frame 102. A payload carrier 104 is pivotally mounted to the frame 102. Further, an operator cab 106 is mounted to the frame 102 above an engine enclosure 108 and located on a front side 110 of the machine 100. The operator cab 106 may include various controls for operating the machine 100 in a desired manner. The machine 100 may be supported on a ground surface 114 by a plurality of wheels 112. Although wheels 112 are disclosed herein, in alternative embodiments, the machine 100 could include other types of ground engaging members such as tracks in lieu of the wheels 112 disclosed herein.

One or more power sources (not shown) may be housed within the engine enclosure 108. The power source may be configured to provide power to the wheels 112 so that the machine 100 may be propelled on the ground surface 114. In an embodiment, the power source is a dual fuel engine 200 as shown schematically in FIG. 2. Although the dual fuel engine 200 is disclosed herein as being configured for use in a mobile machine, for example, in driving the wheels 112 of the LMT shown in the illustrated embodiment of FIG. 1, in other embodiments, the dual fuel engine 200 may be configured for use in providing power to stationary machines, for example, a power generating set, a compressor, or other types of stationary machines known in the art. Therefore, it may be noted that a type of machine disclosed herein is non-limiting of this disclosure.

Figure 2:
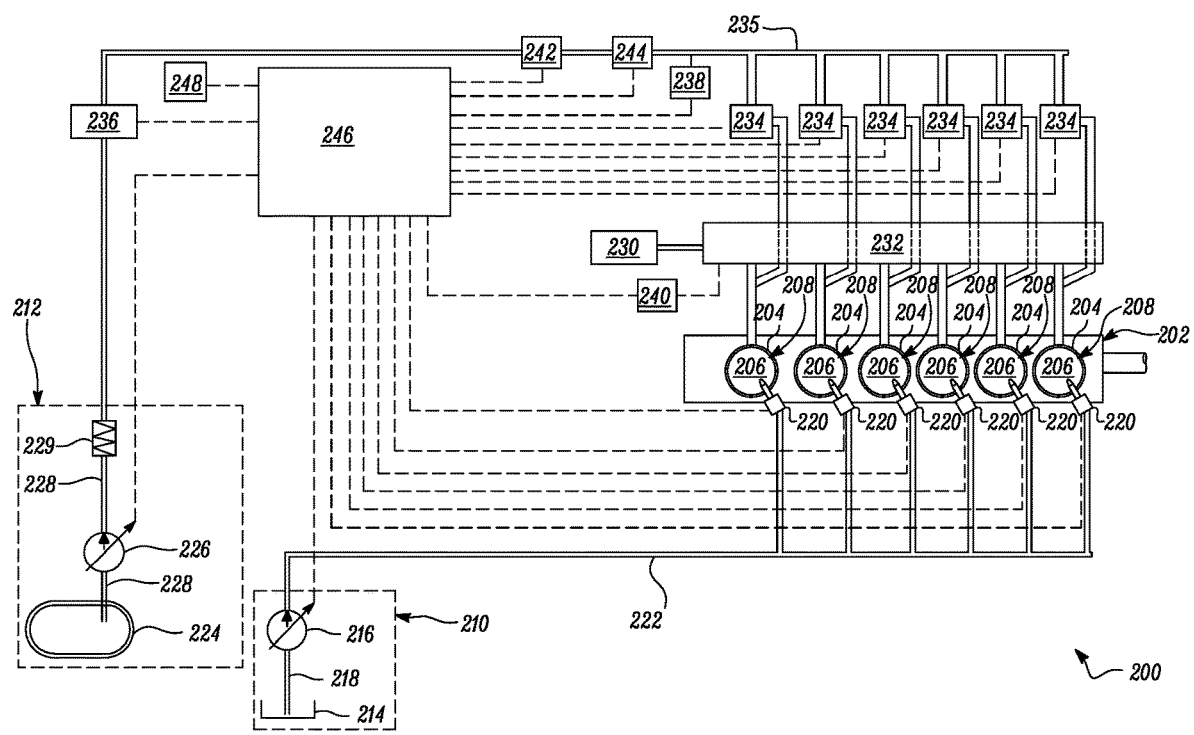
FIG. 2 illustrates a schematic representation of a dual fuel engine having a gas shut off valve in a gas fuel rail of the dual fuel engine, according to an aspect of the present disclosure.

Referring to the exemplary embodiment of FIG. 2, the dual fuel engine 200 includes an engine block 202 that is configured to define multiple cylinders 204. In the illustrated embodiment of FIG. 2, the engine block 202 is shown to define six cylinders 204. However, in other embodiments, the dual fuel engine 200 may include a multi-cylinder engine that is configured to include fewer or more cylinders than that shown in the illustrated embodiment of FIG. 2.

Each cylinder 204 is configured to slidably receive a piston 206 therein for executing reciprocating motion within a corresponding one of the cylinders 204. As such, the cylinder 204 and the piston 206 together define a combustion chamber 208 that is configured to operatively facilitate combustion of a fuel-air mixture for producing power. The dual fuel engine 200 is configured to operate using one or more of a liquid fuel and a gaseous fuel. In the illustrated embodiment of FIG. 2, the dual fuel engine 200 may embody a diesel-gas blended engine in which each of the combustion chambers 208 may typically receive a compression ignited fuel, for instance, diesel, and a lesser volatile fuel, for example, liquified natural gas (LNG). However, it will be appreciated by persons skilled in the art that aspects disclosed herein can be similarly applied in the cases of a dual fuel direct injected gas (DIG) engine, or a pure spark ignited natural gas or gasoline engine without limiting the scope of the present disclosure.

Accordingly, as shown in FIG. 2, the dual fuel engine 200 includes a liquid fuel supply system 210 and a gaseous fuel supply system 212. The liquid fuel supply system 210 disclosed herein may be, for example, a diesel fuel supply system. The liquid fuel supply system 210 may include a liquid fuel reservoir 214 that is configured to store liquid fuel therein. A liquid fuel pump 216 may draw the liquid fuel from this reservoir 214 via a liquid fuel supply line 218, pressurize the drawn liquid fuel, and output the pressurized liquid fuel to a liquid fuel rail 222. As shown, the dual fuel engine 200 may include multiple fuel injectors 220 that are associated with corresponding ones of the combustion chambers 208 present on the dual fuel engine 200. Therefore, the pressurized liquid fuel from the liquid fuel pump 216 can be routed into one or more of the fuel injectors 220 via the liquid fuel rail 222. During operation of the engine 200, each of the fuel injectors 220 may selectively communicate the pressurized liquid fuel from the liquid fuel rail 222 to corresponding ones of the combustion chambers 208 present on the dual fuel engine 200.

The gaseous fuel supply system 212 disclosed herein may be, for example, an LNG supply system. As shown in the illustrated embodiment of FIG. 2, the gaseous fuel supply system 212 may include a gaseous fuel reservoir 224 that is configured to store a gaseous fuel therein. A gaseous fuel pump 226 may draw the gaseous fuel from this reservoir 224, pressurize the drawn gas, and output the pressurized gas via a gas fuel supply line 228. Alternatively, the gaseous fuel supply system 212 may not include a gaseous fuel pump 226, but rather utilize the vapor pressure of the fuel stored within the gaseous fuel reservoir 224 to supply pressure to the combustion chambers 208 of the dual fuel engine 200. As used herein, the terms "gaseous fuel" and "liquid fuel" are used to distinguish the two fuels as they are consumed by the engine 202. However, it should be understood that the gaseous fuel is stored in a liquid state in the gaseous fuel reservoir 224.

The gaseous fuel supply system 212 may further include a heat exchanger 229 configured to transfer heat to the gaseous fuel, converting the gaseous fuel from a liquid state in which it is stored to a gaseous state for consumption by the engine 200. Heat exchanger 229 may be a tube-and-fin type heat exchanger configured to vaporize the gaseous fuel by transferring heat from ambient air. Alternatively, heat exchanger 229 may be configured as a shell-and-tube type heat exchanger configured to vaporize the gaseous fuel by transferring heat from a coolant (not shown) for the engine 202. It should be apparent that any heat exchanger configuration may be used to vaporize the gaseous fuel in accordance with the present disclosure.

As shown, the dual fuel engine 200 also includes an air source 230 that is configured to provide a pressurized supply of air. This air source 230 may include, but is not limited to, a turbocharger, an exhaust gas recirculation (EGR) system or other devices commonly known to persons skilled in the art. The air source 230 may be disposed in fluid communication with the combustion chambers 208 of the engine 200 via an air intake manifold 232. Moreover, the dual fuel engine 200 also includes multiple gas admission valves 234 that are configured to selectively communicate the pressurized gaseous fuel from a gas fuel rail 235 to corresponding ones of the combustion chambers 208 via the air intake manifold 234. In the illustrated embodiment of FIG. 2, the dual fuel engine 200 is shown to include six gas admission valves 234 to correspond with each of the six cylinders 204 of the engine 200. However, it may be noted that in an alternative embodiment, the dual fuel engine 200 may include fewer or more gas admission valves than that shown in the illustrated embodiment of FIG. 2.

As shown in the illustrated embodiment of FIG. 2, the dual fuel engine 200 may further include a gas pressure regulator 236 disposed in the gaseous fuel supply line 228 and located between the heat exchanger 229 and the gas fuel rail 235. This gas pressure regulator 236 may be configured to regulate an amount of pressure associated with the gas before being routed into the cylinders 204.

Further, as shown in FIG. 2, the dual fuel engine 200 includes a gas fuel rail pressure sensor 238 and an air intake manifold pressure sensor 240. The gas fuel rail pressure sensor 238 that is disposed in communication with the gas fuel rail 235, and the air intake manifold pressure sensor 240 is disposed in communication with the air intake manifold 232. The gas fuel rail pressure sensor 238 is hereinafter referred to as 'the first sensor' while the air intake manifold pressure sensor 240 is hereinafter referred to as 'the second sensor'.

The present disclosure relates to determining failure of a shut off valve associated with the dual fuel engine 200. More specifically, this shut off valve may be a gas shut off valve denoted generally by numeral '242' in the schematic illustration of FIG. 2. Although aspects of the present disclosure will be explained in reference to determining failure of the gas shut off valve 242, it may be noted that these aspects of the present disclosure can be similarly applied to determine failure of any of the gas admission valves 234 that are configured to selectively communicate gaseous fuel from the gas fuel rail 235 to the air intake manifold 232 and one or more combustion chambers 208 of the engine 200. Alternatively, aspects disclosed herein can also be similarly applied to determine failure of a purge valve 244 that is disposed in communication with the gas fuel rail 235. As such, the purge valve 244 may be operated to selectively depressurize the gas fuel rail 235 on occasion, or when needed, for example, when a pressure in the gas fuel rail 235 increases to an unacceptable value. It may be noted that the gas admission valves 234 and the purge valve 244 disclosed herein may be embodied as electromechanically actuated valves.

The dual fuel engine 200 also includes a controller 246 in communication with the first sensor 238 and the second sensor 240 respectively. While the dual fuel engine 200 is operating, the controller 246 is configured to sense and record a gas fuel rail pressure $((P_R)_{T1})$ at a first time (T1) from the first sensor 238. The first time (T1) disclosed herein may be regarded as any instant of time when the engine 200 is operating i.e., at any instant of time after commencing an operation of the engine at time T0. The controller 246 is also configured to sense and record a boost pressure $((P_B)_{T1})$ at the first time (T1) from the second sensor 240. The controller 246 is then configured to open the gas shut off valve 242 i.e., the gas admission valve 234 or the purge valve 244 at a second time (T2) and hold the gas shut off valve 242 in its open state. The controller 246 closes the gas shut off valve 242 after a predetermined interval at a third time (T3).

Figure 3:
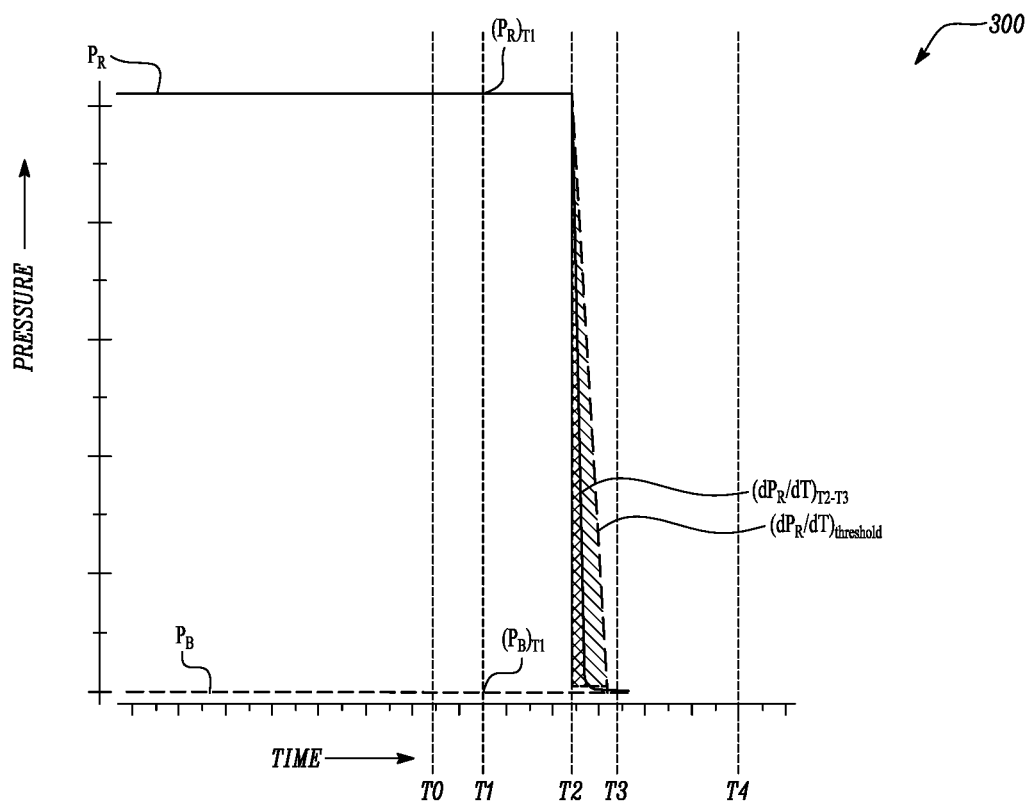
FIG. 3 illustrates a graphical representation of variation in pressure of the gas fuel rail with respect to time, according to an exemplary aspect of the present disclosure.

Referring to an exemplary graphical representation 300 shown in FIG. 3, the controller 244 may plot a variation in the pressure $(P_R)$ of the gas fuel rail 235 over time. This variation $(dP_R/dT)$ in the pressure $(P_R)$ of the gas fuel rail 235 over time is hereinafter referred to as 'the actual gas rail pressure decay rate'. A threshold gas rail pressure decay rate is also predefined to the controller 246 as shown by a dotted plot '$((dP_R/dT)_{threshold})$' in the exemplary graphical representation 300 of FIG. 3. This threshold gas rail pressure decay rate $((dP_R/dT)_{threshold})$ may be known before-hand to the controller 246, for example, from historical data obtained during trial runs of the dual fuel engine, or from theoretical models, statistical models, experimental data or by other means known in the art.

With continued reference to FIG. 3, at time T0, operation of the dual fuel engine 200 has been commenced. It may be noted that pressure $(P_R)$ in the gas fuel rail 235 prior to time T0 may be a fixed constant value above boost pressure $(P_B)$ as the gas fuel rail 235 may be supplied with pressurized gaseous fuel by the gaseous fuel pump 226, for example, when a key (not shown) for operating the dual fuel engine 200 has merely been positioned into a ready-to-ignite mode prior to commencing operation of the dual engine 200 at time T0. Moreover, it may also be noted that in the exemplary graphical representation 300 of FIG. 3, an operation of the dual fuel engine 200 may have been commenced in a diesel-only mode owing to the gas shut off valve 242 remaining in its closed position i.e., neither of the gas admission valves 234 and the purge valve 244 has been opened until time (T2).

At time T2, the gas shut off valve 242 has been opened and held in its opened state until time (T3) at which the gas shut off valve 242 has been closed. For the predetermined interval (T2 to T3), in which the gas shut off valve 242 was opened and closed at times (T2) and (T3) respectively, the controller 246 compares an actual gas rail pressure decay rate $((dP_R/dT)_{T2-T3})$ to a threshold gas rail pressure decay rate $((dP_R/dT)_{threshold})$. In the exemplary graphical representation 300 of FIG. 3, a slope of the plot $(P_R)$ during the predetermined interval (T2 to T3) for obtaining the actual gas rail pressure decay rate $((dP_R/dT)_{T2-T3})$ is greater than a slope of the plot for threshold gas rail pressure decay rate $((dP_R/dT)_{threshold})$ and hence, the controller 246 determines that the actual gas rail pressure decay rate $((dP_R/dT)_{T2-T3})$ is greater than the threshold gas rail pressure decay rate $((dP_R/dT)_{threshold})$ for the predetermined interval (T2 to T3) due to which the controller 246 determines that an operation of the gas shut off valve 242 is normal i.e., the gas shut off valve 242 is operating as intended.

In the foregoing scenario, the actual gas rail pressure decay rate $((dP_R/dT)_{T2-T3})$ being greater than the threshold gas rail pressure decay rate $((dP_R/dT)_{threshold})$ may imply that the gaseous fuel from the gas fuel rail 235 is being supplied to the cylinders 204 with an opening of the gas admission valves 234, or that the gaseous fuel from the gas fuel rail 235 is being vented to the atmosphere with an opening of the purge valve 244. However, in the exemplary graphical representation 300 of FIG. 3, if the actual gas rail pressure decay rate $((dP_R/dT)_{T2-T3})$ corresponding to the predetermined interval (T2 to T3) were to be equal to the threshold gas rail pressure decay rate (($dP_R/dT$)$_{threshold}$), the controller 246 would determine that the gas shut off valve 242 has failed i.e., the gas shut off valve 242 is not operating as intended.

Figure 4:
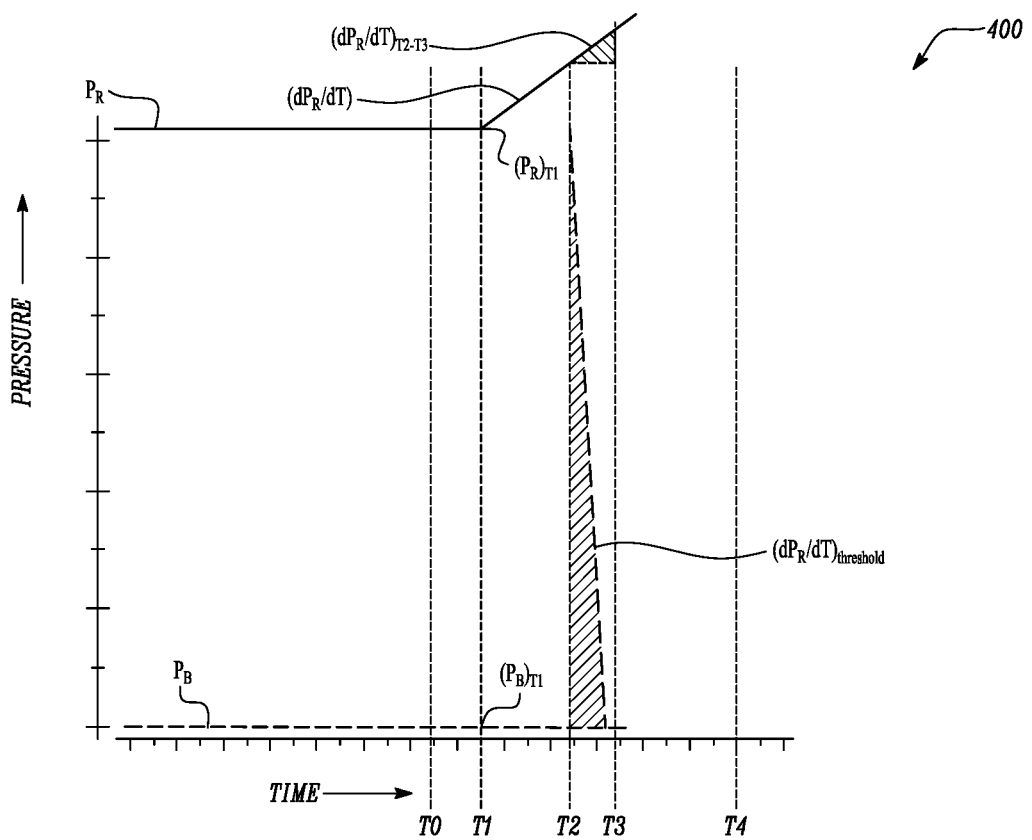
FIG. 4 illustrates an exemplary graphical representation of variation in pressure of the gas fuel rail with respect to time, according to an aspect of the present disclosure.

Also, referring to another exemplary graphical representation 400 shown in FIG. 4, the controller 246 determines that the slope of the plot ($dP_R/dT$) starts to increase from time (T1) onwards indicating that the pressure ($P_R$) in the gas fuel rail 235 has been increasing since time (T1) although operation of the dual fuel engine 200 was commenced in a diesel-only mode at time (T0). The controller 246 also determines from the slope of the plot ($dP_R/dT$) that the pressure ($P_R$) in the gas fuel rail 235 has been increasing in value regardless of a command being issued by the controller 246 to open the gas shut off valve 242 at time (T2). Further, from comparison of the slopes of the actual gas rail pressure decay rate (($dP_R/dT$)$_{T2-T3}$) and the threshold gas rail pressure decay rate (($dP_R/dT$)$_{threshold}$) depicted in the exemplary graphical representation 400 of FIG. 4, the controller 246 also determines that the actual gas rail pressure decay rate (($dP_R/dT$)$_{T2-T3}$) is less than the threshold gas rail pressure decay rate (($dP_R/dT$)$_{threshold}$), and hence, determines that the gas shut off valve 242 has failed i.e., the gas shut off valve 242 is not operating as intended. A plot of gas rail pressure ($P_R$) having a profile such as that shown in FIG. 4 would be expected for an extremely large leak across the gas shut off valve 242. However, if the actual gas rail pressure decay rate (($dP_R/dT$)$_{T2-T3}$) is less than expected due to the actual gas rail pressure ($P_R$) decreasing more slowly than expected i.e., (($dP_R/dT$)$_{T2-T3}$)≤(($dP_R/dT$)$_{threshold}$), a profile of such a plot for the gas rail pressure ($P_R$), shown in FIG. 6, may indicate that additional pressure is being supplied to the gas fuel rail 235, most likely, through the leaking gas shut off valve 242.

Figure 5:
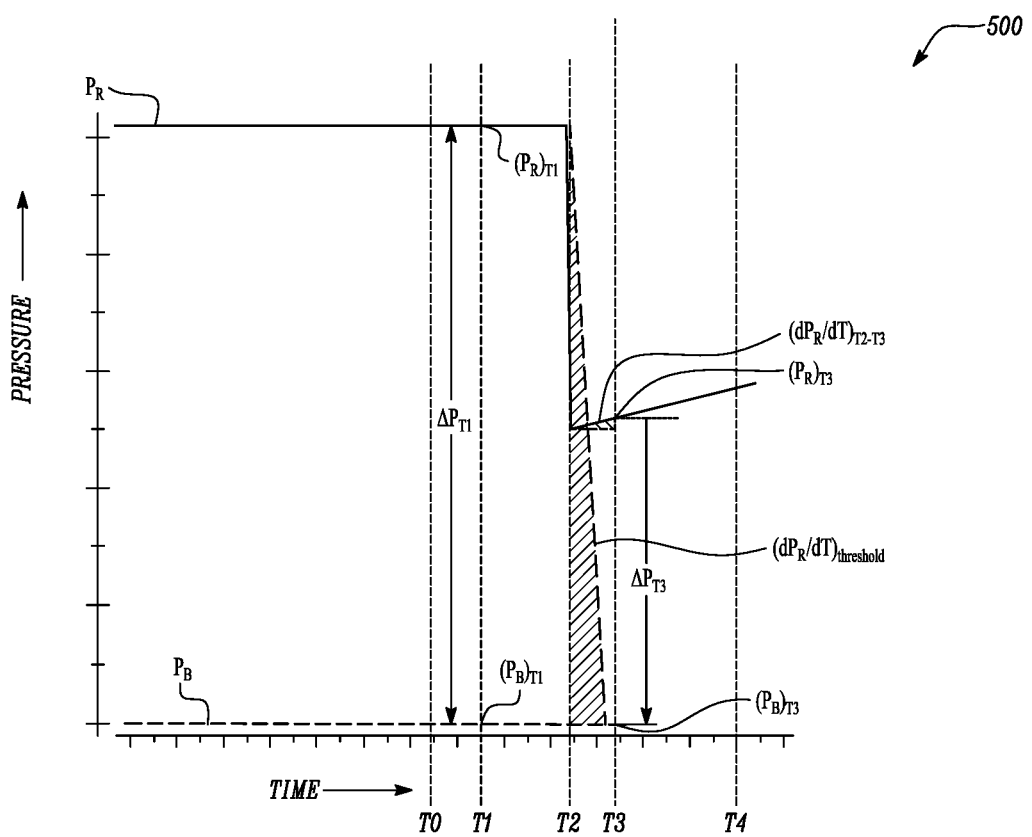
FIG. 5 illustrates another exemplary graphical representation of variation in pressure of the gas fuel rail with respect to time, according to an aspect of the present disclosure.

Referring to another exemplary graphical representation 500 shown in FIG. 5, the actual gas rail pressure decay rate (($dP_R/dT$)$_{T2-T3}$) is greater than the threshold gas rail pressure decay rate (($dP_R/dT$)$_{threshold}$) for some portion of the predetermined interval (T2 to T3). Thereafter, the pressure ($P_R$) in the gas fuel rail 235 increases with time causing the actual gas rail pressure decay rate (($dP_R/dT$)$_{T2-T3}$) to become less than the threshold gas rail pressure decay rate (($dP_R/dT$)$_{threshold}$). In such a scenario, the controller 246, according to an embodiment herein, is configured to compare a difference ($\Delta P_{T3}$) between the gas fuel rail pressure (($P_R$)$_{T3}$) and the boost pressure (($P_B$)$_{T3}$) at the third time (T3) with a difference ($\Delta P_{T1}$) between the gas fuel rail pressure (($P_R$)$_{T1}$) and the boost pressure (($P_B$)$_{T1}$) at the first time (T1).

In this embodiment, the controller 246 determines that the gas shut off valve 242 has failed if the difference ($\Delta P_{T3}$) between the gas fuel rail pressure (($P_R$)$_{T3}$) and the boost pressure (($P_B$)$_{T3}$) at the third time (T3) is greater than the difference ($\Delta P_{T1}$) between the gas fuel rail pressure (($P_R$)$_{T1}$) and boost pressure (($P_B$)$_{T1}$) at the first time (T1) i.e., if ($\Delta P_{T3}$)>($\Delta P_{T1}$), for example, as shown in the graphical representation 500 of FIG. 5. It is envisioned that if the pressure ($P_R$) in the gas fuel rail 235 increases during any instant of time within the predetermined interval (T2 to T3), then the gas shut off valve 242, that was commanded to open at time (T2), may be stuck in a partially open position. Even if a command has been issued by the controller 246 to close the gas shut off valve 242 at time (T3), a portion of the pressurized air from the air intake manifold 232 may now flow into the gas fuel rail 235 due to the partially open position of the gas shut off valve 242 i.e., a portion of the boost pressure ($P_B$) is being contributed to the gas fuel rail 235 thereby increasing the pressure ($P_R$) in the gas fuel rail 235.

Figure 6:
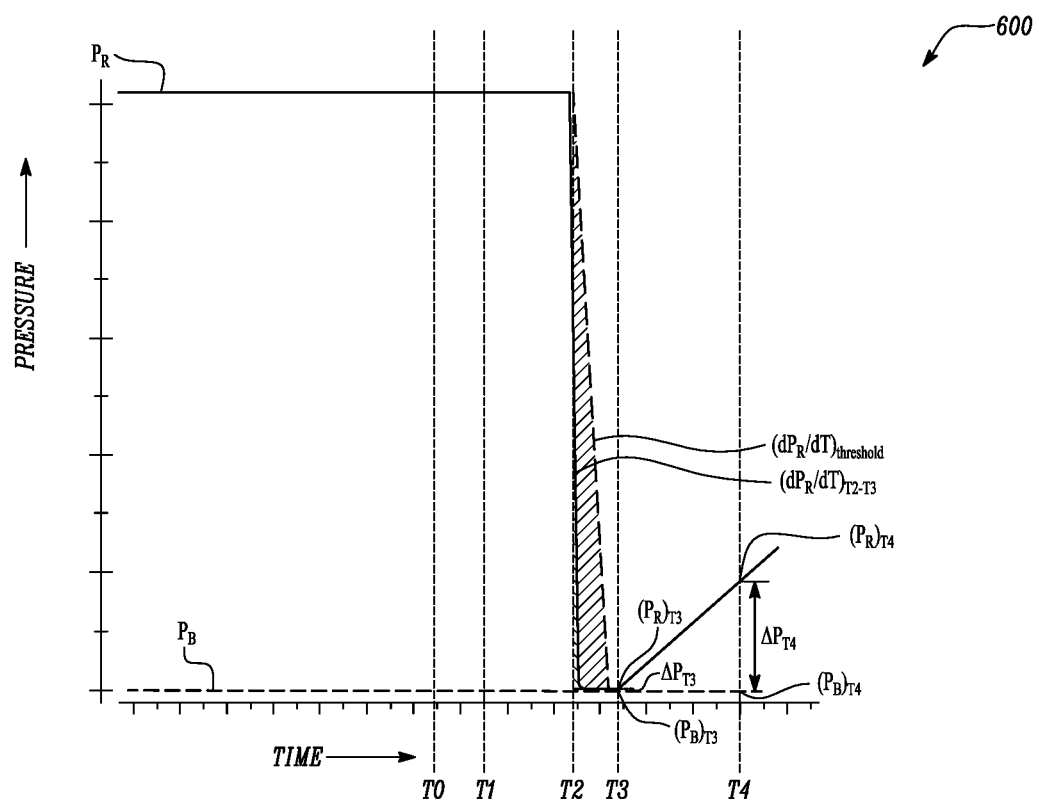
FIG. 6 illustrates yet another graphical representation of variation in pressure of the gas fuel rail with respect to time, according to an aspect of the present disclosure.

Referring to yet another exemplary graphical representation 600 shown in FIG. 6, the actual gas rail pressure decay rate is greater than the threshold gas rail pressure decay rate i.e., the pressure ($P_R$) in the gas fuel rail 235 decreases until the pressure ($P_R$) of the gas fuel rail 235 becomes equal to the boost pressure ($P_B$) of the air intake manifold 232 in the predetermined interval (T2 to T3). Thereafter, when the gas shut off valve 242 is commanded to close at time (T3), the pressure ($P_R$) of the gas fuel rail 235 may increase as shown in the exemplary graphical representation 600 of FIG. 6. In such a scenario, the controller 246, according to an embodiment herein, is configured to compare a difference ($\Delta P_{T4}$) in the gas fuel rail pressure (($P_R$)$_{T4}$) and the boost pressure (($P_B$)$_{T4}$) at a fourth time (T4) with the difference ($\Delta P_{T3}$) in the gas fuel rail pressure (($P_R$)$_{T3}$) and the boost pressure (($P_B$)$_{T3}$) at the third time (T3). If the difference ($\Delta P_{T4}$) in the gas fuel rail pressure (($P_R$)$_{T4}$) and the boost pressure (($P_B$)$_{T4}$) at the fourth time (T4) is greater than the difference ($\Delta P_{T3}$) in the gas fuel rail pressure (($P_R$)$_{T3}$) and the boost pressure (($P_B$)$_{T3}$) at the third time (T3) i.e., if ($\Delta P_{T4}$)>($\Delta P_{T3}$), for example, as shown in the graphical representation 600 of FIG. 6, then the controller 246 determines that the gas shut off valve 242 has failed. It is envisioned that if the pressure ($P_R$) in the gas fuel rail 235 increases after time (T3), then the gas shut off valve 242, that was commanded to open at time (T2), may be stuck in its fully open position and therefore, the pressure ($P_R$) in the gas fuel rail 235 had initially decreased to a value equal to the boost pressure ($P_B$). Although a command has been issued by the controller to close the gas shut off valve at time (T3), the pressurized air from the air intake manifold 232 may now flow into the gas fuel rail 235 due to the fully open position of the gas shut off valve 242 i.e., the boost pressure ($P_B$) is being contributed to the gas fuel rail 235 thereby increasing the pressure ($P_R$) in the gas fuel rail 235.

As the present disclosure is explained in conjunction with the use of the first sensor i.e., the gas fuel rail pressure sensor 238 and the second sensor i.e., the air intake manifold pressure sensor 240, it will be appreciated that by obtaining pressure values obtained from the first and second sensors 238, 240 respectively, the controller 246 can use the pressures values in the gas fuel rail 235 and the air intake manifold 232 to determine whether gas is leaking past any of the gas admission valves 234 such as that depicted in the exemplary graphical representation 400, or whether boost pressure ($P_B$) is leaking past any of the gas admission valves 234 such as that depicted in each of the exemplary graphical representations 400 and 500 respectively. This way, the controller 246 can identify a source of the leakage, and indicate the same to personnel associated with operation of the dual fuel engine 200.

In a further embodiment, upon determining a failure of the gas shut off valve 242 i.e., upon encountering a scenario depicted in any of the exemplary graphical representations 400, 500, and 600 respectively, the controller 246 is configured to initiate a mitigating action. In one embodiment, the mitigating action could include initiating an alarm for an operator. As shown in the illustrated embodiment of FIG. 1, the controller 246 may be communicably coupled to a notification device 248. The alarm may include an aural alarm, a visual alarm, or a haptic based alarm to notify the operator of the failed gas shut off valve 242. In other embodiments, the controller 246 may be configured to, additionally, or optionally, derate an output of the dual fuel engine 200, stop a supply of the gaseous fuel to the engine 200, for example, by turning off the gaseous fuel pump 226 and operating the engine 200 in a diesel-only mode. In yet another embodiment, the controller 246 may be configured to actuate specific system hardware for shutting down the dual fuel engine 200.

The controller 246 disclosed herein could include various software and/or hardware components that are configured to perform functions consistent with the present disclosure. As such, the controller 246 of the present disclosure may be a stand-alone control module or may be configured to co-operate with an existing electronic control module (ECU) (not shown) of the machine 100. Further, it may be noted that the controller 246 disclosed herein may embody a single microprocessor or multiple microprocessors that include components for selectively and independently actuating specific system hardware associated with the dual fuel engine 200 of the present disclosure.

Numerous commercially available microprocessors can be configured to perform the functions of the controller 246 disclosed herein. It should be appreciated that the controller 246 could readily be embodied in a general machine micro-processor capable of controlling numerous machine functions. The controller 246 may include a memory, a secondary storage device, a processor, and any other components for running an application. Various other circuits may be associated with the controller 246 such as power supply circuitry, signal conditioning circuitry, solenoid driver circuitry, and other types of circuitry. Various routines, algorithms, and/or programs can be programmed within the controller 246 for execution thereof to actuate specific system hardware associated with the dual fuel engine 200.

INDUSTRIAL APPLICABILITY

The present disclosure provides a system and method for determining a failure of the gas shut off valve 242 i.e., the purge valve 244 or one of the gas admission valves 234 in fluid communication with the gas fuel rail 235 of the dual fuel engine 200. With use of the system disclosed herein, the controller 246 can help operators of machines to reliably determine the failure of the gas shut off valve 242. Moreover, in response to a failure of the gas shut off valve 242, the controller 246 of the present disclosure is also configured to perform one or more mitigating actions disclosed earlier herein. These mitigating actions may help prevent undesirable consequences from occurring in the operation of the dual fuel engine 200 in the event of failure of the gas shut off valve 242, and may also notify operators so that remedial measures, if needed, can be taken up prior to resuming operation of the dual fuel engine 200.

Figure 7:
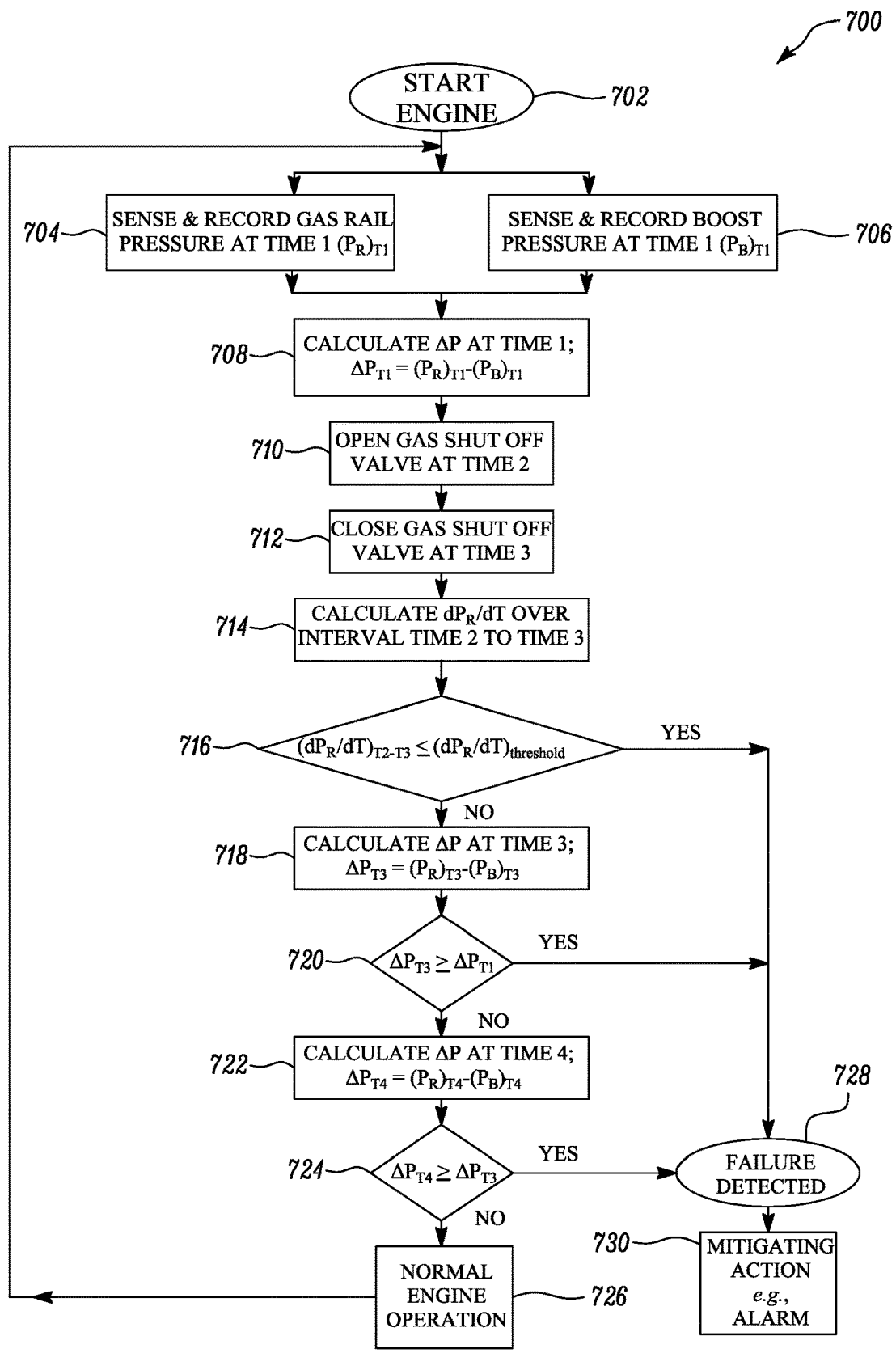
FIG. 7 illustrates a flowchart of a method for determining failure of the gas shut off valve, according to an aspect of the present disclosure.

FIG. 7 illustrates a method 700 for determining a failure of the gas shut off valve 242, in accordance with an embodiment of the present disclosure. As shown, at step 702, the method 700 includes commencing an operation of the dual fuel engine 200. At step 704, the method 700 includes sensing and recording the gas fuel rail pressure $((P_R)_{T1})$ at the first time (T1) using the first sensor 238 after the dual fuel engine 200 has been started. Simultaneously, as shown at step 706, the method 700 further includes sensing and recording the boost pressure $((P_B)_{T1})$ at the first time (T1) using the second sensor 240. At step 708, the method 700 further includes computing the difference $(\Delta P_{T1})$ between the gas fuel rail pressure $((P_R)_{T1})$ and the boost pressure $((P_B)_{T1})$.

The method 700 then proceeds to step 710 in which the method 700 includes opening the gas shut-off valve 242 at time (T2). The method 700 then proceeds to step 712 in which the method 700 includes closing the gas shut-off valve 242 at time (T3). At step 714, the method 700 further includes calculating, by means of the controller 246, the actual gas fuel rail pressure decay rate $((dP_R/dT)_{T2-T3})$ over the predetermined interval (T2 to T3).

At step 716, the method 700 further includes comparing the actual gas fuel rail pressure decay rate $((dP_R/dT)_{T2-T3})$ with the threshold gas fuel rail pressure decay rate $((dP_R/dT)_{threshold})$. If at step 716, the controller 246 determines that the actual gas fuel rail pressure decay rate $((dP_R/dT)_{T2-T3})$ is less than or equal to the threshold gas fuel rail pressure decay rate $((dP_R/dT)_{threshold})$, the method 700 proceeds from step 716 to step 728 in which the controller 246 determines that the gas shut off valve 242 has failed.

If at step 716, the controller 246 determines that the actual gas fuel rail pressure decay rate $((dP_R/dT)_{T2-T3})$ is greater than the threshold gas fuel rail pressure decay rate $((dP_R/dT)_{threshold})$, the method 700 proceeds from step 716 to step 718 in which the controller 246 calculates the difference $(\Delta P_{T3})$ between the gas fuel rail pressure $((P_R)_{T3})$ and the boost pressure $((P_B)_{T3})$ at the time (T3). The method 700 then proceeds from step 718 to step 720 in which the controller 246 compares the difference $(\Delta P_{T3})$ between the gas fuel rail pressure $((P_R)_{T3})$ and the boost pressure $((P_B)_{T3})$ at the time (T3) with the difference $(\Delta P_{T1})$ between the gas fuel rail pressure $((P_R)_{T1})$ and the boost pressure $((P_B)_{T1})$ at time (T1). If at step 720, the controller 246 determines that the difference $(\Delta P_{T1})$ between the gas fuel rail pressure $((P_R)_{T3})$ and the boost pressure $((P_B)_{T3})$ at the time (T3) is greater than or equal to the difference $(\Delta P_{T1})$ between the gas fuel rail pressure $((P_R)_{T1})$ and the boost pressure $((P_B)_{T1})$ at time (T1), then the method 700 proceeds from step 720 to step 728 in which the controller 246 determines that the gas shut off valve 242 has failed.

If at step 720, the controller 246 determines that the difference $(\Delta P_{T3})$ between the gas fuel rail pressure $((P_R)_{T3})$ and the boost pressure $((P_B)_{T3})$ at the time (T3) is less than the difference $(\Delta P_{T1})$ between the gas fuel rail pressure $((P_R)_{T1})$ and the boost pressure $((P_B)_{T1})$ at time (T1), then the method 700 proceeds from step 720 to step 722 in which the controller 246 calculates the difference $(\Delta P_{T4})$ between the gas fuel rail pressure $((P_R)_{T4})$ and the boost pressure $((P_B)_{T4})$ at the time (T4). The method 700 then proceeds from step 722 to step 724 in which the controller 246 compares the difference $(\Delta P_{T4})$ between the gas fuel rail pressure $((P_R)_{T4})$ and the boost pressure $((P_B)_{T4})$ at the time (T4) with the difference $(\Delta P_{T3})$ between the gas fuel rail pressure $((P_R)_{T3})$ and the boost pressure $((P_B)_{T3})$ at the time (T3). If at step 724, the controller 246 determines that the difference $(\Delta P_{T4})$ between the gas fuel rail pressure $((P_R)_{T4})$ and the boost pressure $((P_B)_{T4})$ at the time (T4) is greater than or equal to the difference $(\Delta P_{T3})$ between the gas fuel rail pressure $((P_R)_{T3})$ and the boost pressure $((P_B)_{T3})$ at the time (T3), then the method 700 proceeds from step 724 to step 728 in which the controller 246 determines that the gas shut off valve 242 has failed.

However, if at step 724, the controller 246 determines that the difference $(\Delta P_{T4})$ between the gas fuel rail pressure $((P_R)_{T4})$ and the boost pressure $((P_B)_{T4})$ at the time (T4) is less than the difference $(\Delta P_{T3})$ between the gas fuel rail pressure $((P_R)_{T3})$ and the boost pressure $((P_B)_{T3})$ at the time (T3), then the method 700 proceeds from step 724 to step 726 at which the method 700 includes continuing to maintain normal engine operation. Upon continuing to maintain engine operation at step 726, the method 700 is also configured to loop from step 726 to simultaneously perform steps 704 and 706 at a time (T1) from a subsequent time frame.

It may be noted that if the method 700 proceeds from steps 716, 720, or 724 to step 728 in which the failure of the gas shut off valve 242 has been determined, the method 700 is also configured to additionally proceed from step 728 to step 730 in which a mitigating action is performed by the controller 246. As disclosed earlier herein, the mitigating actions could include initiating at least one of an alarm for an operator, derating an output of the dual fuel engine 200, stopping a supply of the gaseous fuel to the engine 200, operating the engine 200 in a diesel-only mode, and shutting down the engine 200.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

What is claimed is:

1. A method for determining failure of an electromechanically actuated gas shut off valve supplying a gas fuel rail associated with a dual fuel engine, the method comprising steps of:
   after the dual fuel engine has been started, sensing and recording a gas fuel rail pressure at a first time using a first sensor in communication with the gas fuel rail;
   sensing and recording a boost pressure at the first time using a second sensor in communication with an intake air manifold;
   opening the gas shut off valve at a second time and holding the gas shut off valve open;
   closing the gas shut off valve after a predetermined interval at a third time;
   comparing an actual gas rail pressure decay rate to a threshold gas rail pressure decay rate for the predetermined interval;
   determining failure of the gas shut off valve when the actual gas rail pressure decay rate is equal to or less than the threshold gas rail pressure decay rate; and
   upon determining failure of the gas shut off valve, initiating a mitigating action.

2. The method of claim 1, wherein the mitigating action is one or more of initiating an alarm for an operator, derating an output of the dual fuel engine, stopping supply of the gas fuel to the engine, operating the engine in a diesel-only mode, and shutting down the engine.

3. The method of claim 1, wherein when the actual gas rail pressure decay rate is greater than the threshold gas rail pressure decay rate, further comprising the steps of:
   comparing a difference in gas fuel rail pressure and boost pressure at the third time with a difference in gas fuel rail pressure and boost pressure at the first time; and
   determining failure of the gas shut off valve when the difference in gas fuel rail pressure and boost pressure at the third time is greater than the difference in gas fuel rail pressure and boost pressure at the first time.

4. The method of claim 3, further comprising the step of:
   determining failure of the gas shut off valve when the difference in gas fuel rail pressure and boost pressure at the third time is equal to the difference in gas fuel rail pressure and boost pressure at the first time.

5. The method of claim 3, wherein when the difference in gas fuel rail pressure and boost pressure at the third time is less than the difference in gas fuel rail pressure and boost pressure at the first time, further comprising the steps of:
   comparing a difference in gas fuel rail pressure and boost pressure at a fourth time with a difference in gas fuel rail pressure and boost pressure at the third time; and
   determining failure of the gas shut off valve when the difference in gas fuel rail pressure and boost pressure at the fourth time is greater than the difference in gas fuel rail pressure and boost pressure at the third time.

6. The method of claim 5, further comprising the step of:
   determining failure of the gas shut off valve when the difference in gas fuel rail pressure and boost pressure at the fourth time is equal to the difference in gas fuel rail pressure and boost pressure at the third time.

7. A control system for determining failure of a gas shut off valve supplying a gas fuel rail associated with a dual fuel engine, the system comprising:
   a gas fuel rail pressure sensor in communication with the gas fuel rail;
   an air intake manifold pressure sensor in communication with an air intake manifold associated with the dual fuel engine; and
   a controller in communication with the gas fuel rail pressure sensor and the air intake manifold pressure sensor, while the dual fuel engine is running, the controller configured to:
   sense and record a gas fuel rail pressure at a first time from the gas fuel rail pressure sensor,
   sense and record a boost pressure at the first time from the air intake manifold pressure sensor,
   open the gas shut off valve at a second time and hold the gas shut off valve open,
   close the gas shut off valve after a predetermined interval at a third time;
   compare an actual gas rail pressure decay rate to a threshold gas rail pressure decay rate for the predetermined interval,
   determine failure of the gas shut off valve when the actual gas rail pressure decay rate is equal to or less than the threshold gas rail pressure decay rate, and
   upon determining failure of the gas shut off valve, initiate a mitigating action.

8. The control system of claim 7, wherein the gas shut off valve comprises one of a purge valve configured to allow selective fluid communication between the gas fuel rail and atmosphere, and a gas admission valve configured to allow selective fluid communication between the gas fuel rail and a combustion chamber associated with the dual fuel engine.

9. The control system of claim 7, wherein the mitigating action is one or more of initiating an alarm for an operator, derating an output of the dual fuel engine, stopping supply of the gas fuel to the engine, operating the engine in a diesel-only mode, and shutting down the engine.

10. The control system of claim 7, wherein when the actual gas rail pressure decay rate is greater than the threshold gas rail pressure decay rate, the controller is configured to:
    compare a difference in gas fuel rail pressure and boost pressure at the third time with a difference in gas fuel rail pressure and boost pressure at the first time; and
    determine failure of the gas shut off valve when the difference in gas fuel rail pressure and boost pressure at the third time is greater than the difference in gas fuel rail pressure and boost pressure at the first time.

11. The control system of claim 10, wherein the controller is configured to:
    determine failure of the gas shut off valve when the difference in gas fuel rail pressure and boost pressure at the third time is equal to the difference in gas fuel rail pressure and boost pressure at the first time.

12. The control system of claim 10, wherein when the difference in gas fuel rail pressure and boost pressure at the third time is less than the difference in gas fuel rail pressure and boost pressure at the first time, the controller is configured to:
    compare a difference in gas fuel rail pressure and boost pressure at a fourth time with a difference in gas fuel rail pressure and boost pressure at the third time; and
    determine failure of the gas shut off valve when the difference in gas fuel rail pressure and boost pressure at the fourth time is greater than the difference in gas fuel rail pressure and boost pressure at the third time.

13. The control system of claim 12, wherein the controller is configured to:
    determine failure of the gas shut off valve when the difference in gas fuel rail pressure and boost pressure at the fourth time is equal to the difference in gas fuel rail pressure and boost pressure at the third time.

14. A dual fuel engine configured for operation using a gaseous fuel and a liquid fuel, the dual fuel engine comprising:
    an engine block defining a plurality of cylinders, a piston being disposed for reciprocating movement within each of the plurality of cylinders;
    a liquid fuel rail configured to supply a liquid fuel from a liquid fuel reservoir to each of the plurality of cylinders;
    a gas fuel rail configured to supply a gaseous fuel from a gaseous fuel reservoir to each of the plurality of cylinders;
    an air intake manifold in fluid communication with each of the plurality of cylinders;
    a gas fuel rail pressure sensor in communication with the gas fuel rail;
    an air intake manifold pressure sensor in communication with the air intake manifold; and
    a controller in communication with the gas fuel rail pressure sensor and the air intake manifold pressure sensor, while the dual fuel engine is running, the controller configured to:
    sense and record a gas fuel rail pressure at a first time from the gas fuel rail pressure sensor,
    sense and record a boost pressure at the first time from the air intake manifold pressure sensor,
    open the gas shut off valve at a second time and hold the gas shut off valve in its open position,
    close the gas shut off valve after a predetermined interval at a third time;
    compare an actual gas rail pressure decay rate to a threshold gas rail pressure decay rate for the predetermined interval,
    determine failure of the gas shut off valve when the actual gas rail pressure decay rate is less than the threshold gas rail pressure decay rate, and
    upon determining failure of the gas shut off valve, initiate a mitigating action.

15. The dual fuel engine of claim 14, wherein the gas shut off valve comprises one of a purge valve configured to allow selective fluid communication between the gas fuel rail and atmosphere, and a gas admission valve configured to allow selective fluid communication between the gas fuel rail and one of the plurality of cylinders.

16. The dual fuel engine of claim 14, wherein the mitigating action is one or more of initiating an alarm for an operator, derating an output of the dual fuel engine, stopping supply of the gas fuel to the engine, operating the engine in a diesel-only mode, and shutting down the engine.

17. The dual fuel engine of claim 14, wherein when the actual gas rail pressure decay rate is greater than the threshold gas rail pressure decay rate, the controller is configured to:
    compare a difference in gas fuel rail pressure and boost pressure at the third time with a difference in gas fuel rail pressure and boost pressure at the first time; and
    determine failure of the gas shut off valve when the difference in gas fuel rail pressure and boost pressure at the third time is greater than the difference in gas fuel rail pressure and boost pressure at the first time.

18. The dual fuel engine of claim 17, wherein when the difference in gas fuel rail pressure and boost pressure at the third time is less than the difference in gas fuel rail pressure and boost pressure at the first time, the controller is configured to:
    compare a difference in gas fuel rail pressure and boost pressure at a fourth time with a difference in gas fuel rail pressure and boost pressure at the third time; and
    determine failure of the gas shut off valve when the difference in gas fuel rail pressure and boost pressure at the fourth time is greater than the difference in gas fuel rail pressure and boost pressure at the third time.

* * * * *